W. A. DOREY.
ILLUMINATING APPLIANCE.
APPLICATION FILED JULY 14, 1919.
1,420,977.
Patented June 27, 1922.
5 SHEETS—SHEET 1.
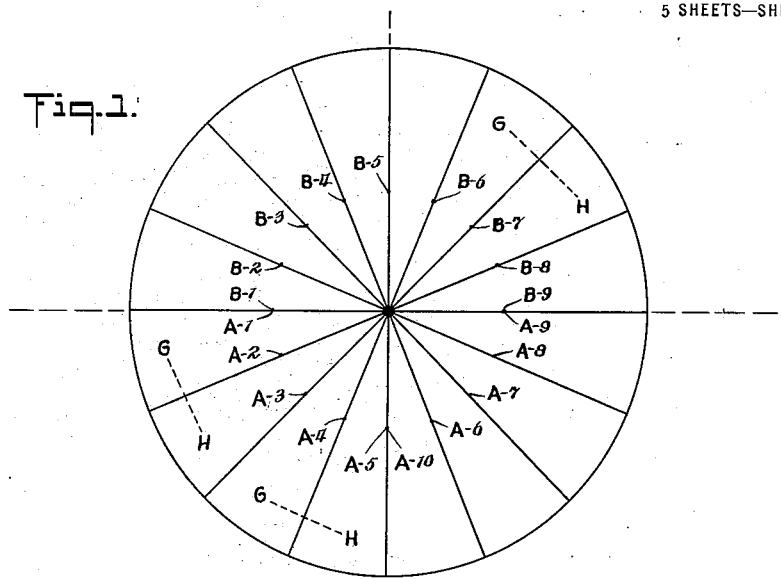
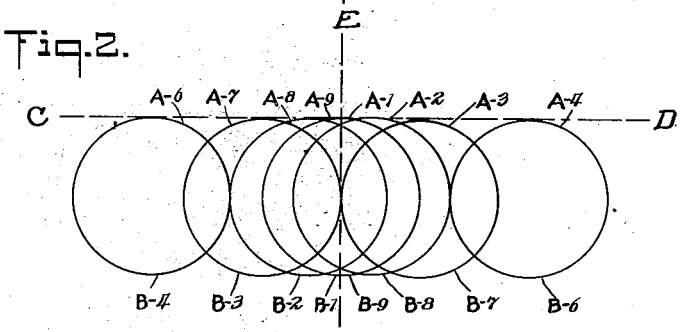
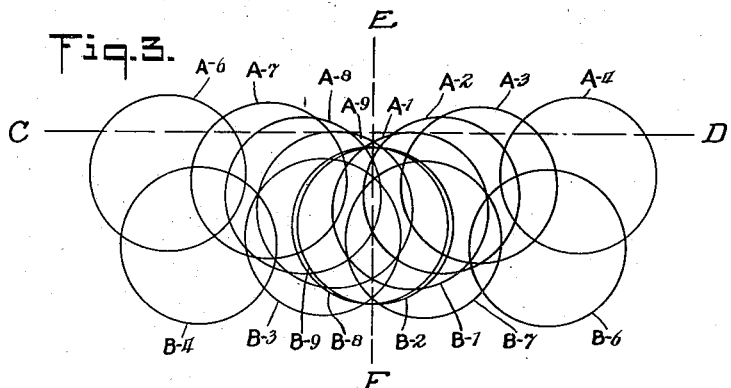
INVENTOR
William A. Dorey
BY
Joel B. Liberman
ATTORNEY

W. A. DOREY.
ILLUMINATING APPLIANCE.
APPLICATION FILED JULY 14, 1919.

1,420,977.

Patented June 27, 1922.

INVENTOR
William A. Dorey
BY
Joel B. Lieberman
ATTORNEY

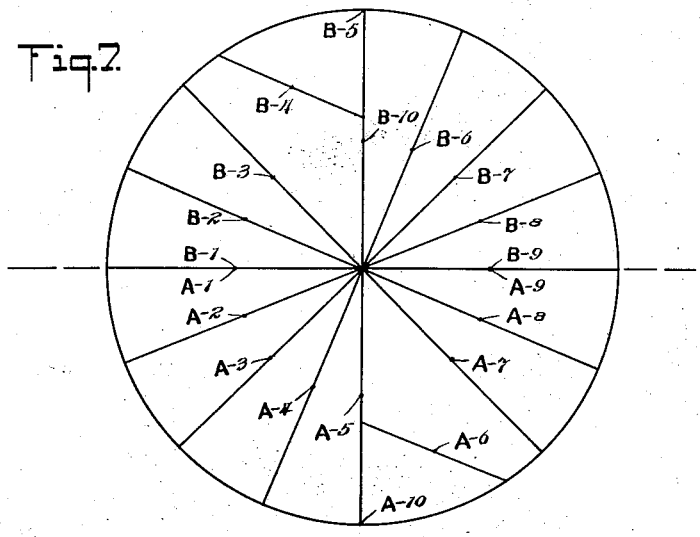
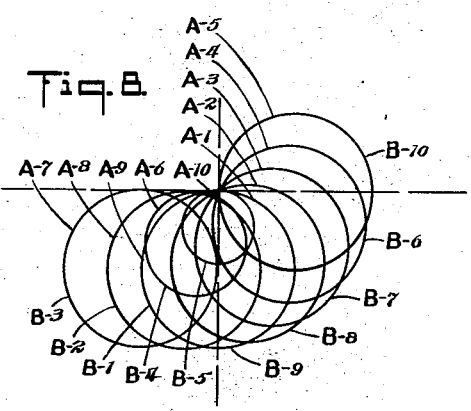
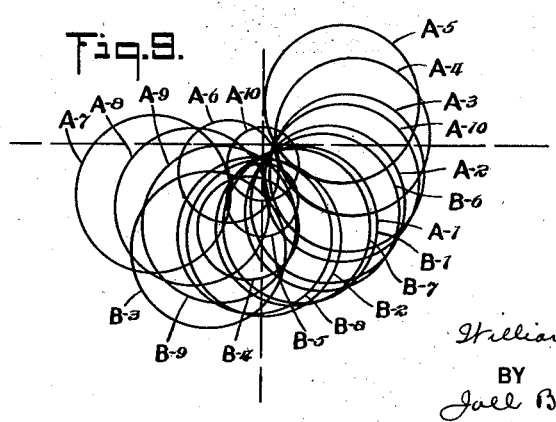

W. A. DOREY.
ILLUMINATING APPLIANCE.
APPLICATION FILED JULY 14, 1919.
1,420,977.
Patented June 27, 1922.
5 SHEETS—SHEET 4.
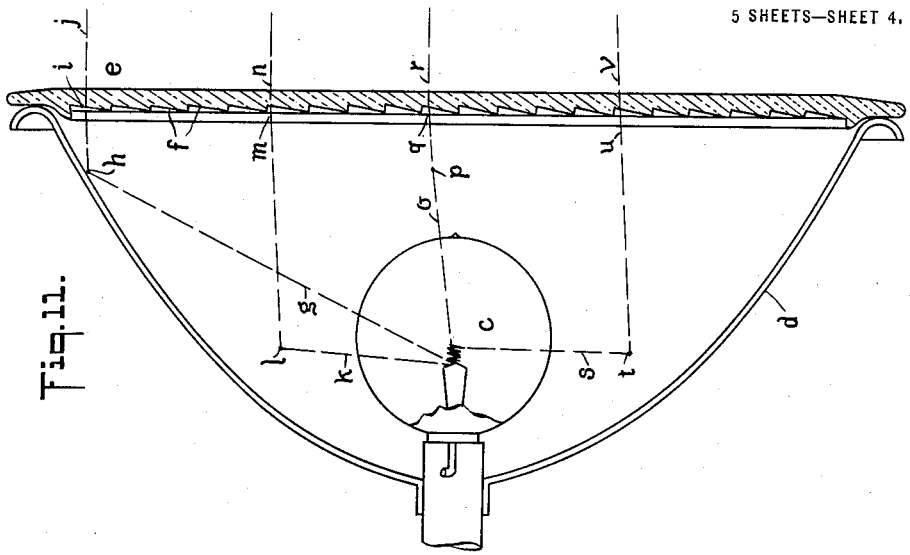
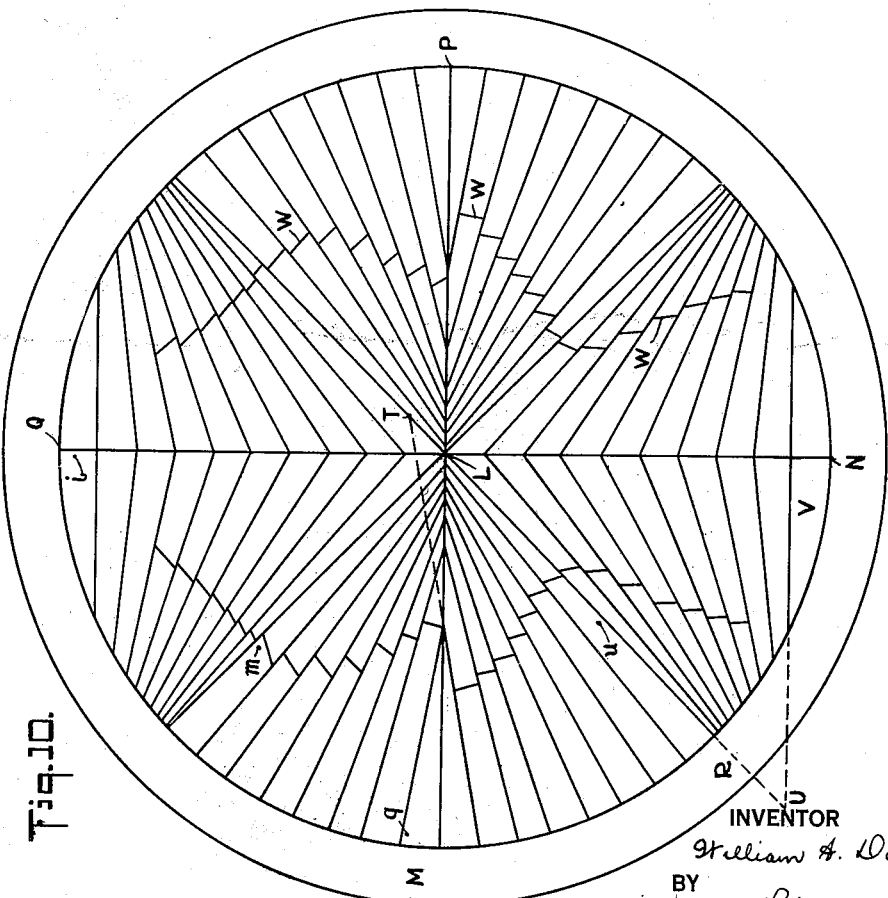
INVENTOR
William A. Dorey
BY
Joel B. Liberman
ATTORNEY

W. A. DOREY.
ILLUMINATING APPLIANCE.
APPLICATION FILED JULY 14, 1919.

1,420,977.

Patented June 27, 1922.
5 SHEETS—SHEET 5.

INVENTOR
William A. Dorey
BY
Joel B. Liberman
ATTORNEY

UNITED STATES PATENT OFFICE.

WILLIAM A. DOREY, OF NEWARK, OHIO, ASSIGNOR TO HOLOPHANE GLASS COMPANY, INC., OF NEW YORK, N. Y., A CORPORATION OF NEW JERSEY.

ILLUMINATING APPLIANCE.

1,420,977.          Specification of Letters Patent.      Patented June 27, 1922.

Application filed July 14, 1919. Serial No. 310,683.

*To all whom it may concern:*

Be it known that I, WILLIAM A. DOREY, a citizen of the United States, residing at Newark, in the county of Licking and State of Ohio, have invented certain new and useful Improvements in Illuminating Appliances, of which the following is a specification.

The object of the present invention is to produce an illuminating appliance giving a wide beam with no part of it at objectionable angles when used with a light source in focus, and so arranged that when the light source is out of focus or inaccurate the light in objectionable directions will be scattered so as not to be of high intensities.

In the specification the invention has been shown and described principally with reference to automobile headlights but it has a wide range of use, and can be employed with advantage in window lighting or in any appliance which involves the use of a light transmitting and directing covering in connection with a reflector.

Figure 1 is a diagrammatic plan view of a headlight plate made according to the invention. Figure 2 is a diagrammatic view of the images of the light source emitted through points on Figure 1 when the lamp is in focus. Figure 3 is a similar view when the lamp is not in focus. Figure 4 is a diagrammatic plan view of a modification of such headlight plate. Figure 5 is a diagrammatic view of the images of the light source emitted through points on Figure 4 when the lamp is in focus. Figure 6 is a similar view when the lamp is not in focus. Figure 7 is a similar diagrammatic view of a further modification of such headlight plate. Figures 8 and 9 are diagrammatic views of images of the light source emitted through points on Figures 7, corresponding to Figures 5 and 6. Figure 10 is a plan view of the practical embodiment of a plate along the lines of the diagrammatic view of Figure 4 and Figure 11 is a vertical cross section of such plate used with the reflector and lamp showing the course of typical light rays. Figs. 12 and 13 are plan views of other modifications of such plates.

My invention contemplates the use of a reflector, preferably in the form of a paraboloid of revolution. In the beam from such a reflector individual reflected images of the light source will tend to assume a radial relation to the axis of the reflector and if the light source be moved out of focus the resultant displacement of reflected images will be in radial directions. Moreover any displacement of images due to irregularities in the reflector will be much more apt to be in radial than in transverse directions. If then deflecting prisms be used on a plate to depress the beam of the reflector and are so disposed that the planes of deflection are radial, light emitted from the reflector alone at abnormally high angles due to poor focus or irregularities will tend to be emitted by the plate at angles close to the axis and produce concentration above the horizontal at the centre of the deflected beam. If the deflecting prisms are so disposed that the planes of deflection are at right angles to radial planes through the axis, light emitted from the reflector alone at abnormally high angles will tend to be emitted by the plate at widely divergent angles and such light will not be concentrated at any angle above the horizontal. Deflecting prisms arranged concentrically will most nearly meet the conditions first stated and give the poorest provision for reducing the intensity of stray light above the horizontal. In any arrangement of prisms the smaller the angle between the planes of deflection and the corresponding radial planes the poorer the provision for reducing the intensity of stray light above the horizontal. The construction shown in Figure 1 provides the maximum angle between the planes of deflection and the corresponding radial planes and will give the best provision for scattering the stray light above the horizontal.

Figure 1 is a diagram of a headlight plate or lens with radial prisms in which the planes of deviation G H are substantially perpendicular to the corresponding radial planes through the axis of the headlamp. The angles of the prisms are such as to depress the images from individual points in the reflector below the horizontal plane through the axis of the headlamp, when the light source is in focus. Representative points in the lens $A^2$, $A^3$, $B^2$, $B^3$, etc., Figure 1, will give images with corresponding lettering in Figure 2. If the light source be moved forward in the reflector a distance equal to one half of the radius of the source, the images from point $A^2$, $A^3$, $B^2$, $B^3$, etc., will appear as in Figure 3. Line C D Figure 2, and Figure 3 represents the horizontal plane through the axis of the headlamp. Line E F Figure 2 and Figure 3 represents the vertical plane through the axis of the head-lamp.

A concentric ringed lens may be evolved which will give, with lamp in focus, exactly the same form of combined image as that produced by the lens shown in Fig. 1, but the location of the individual images will be reversed.

The difference appears when the light source is moved out of focus. In the adjustment used for Figure 3 the images projecting above the horizontal are spread apart widely. The same adjustment with the concentric lens will give images projecting above the horizontal in a compact group near the vertical axis. If the light source be thrown out of focus by a distance equal to the radius, the images projected above the horizontal by the radial construction shown in Fig. 1 will be still more widely spaced, while these projected above the horizontal by the concentric construction will approach the effect from the base headlamp i. e. we might as well use no headlight plate from this point of view. In all prismatic constructions for this service this condition will be approached in a degree measurable by the departure of any portion of the structure from the radial form and its approximation of the concentric form.

I have found however that it is impractical to use the ideal construction of Figure 1 because the images from the prisms at the vertical axis of the plate cannot be depressed, and those near the vertical axis are thrown out so widely that they give only low intensities and subtract from the intensity of the beam straight ahead of the car. The limiting inclination with the horizontal, at which the unmodified construction is to be used, will therefore depend on the spread of light required and on the zones in which it is desired to suppress the beam.

The preferred construction is shown in Fig. 4. Prisms radiating from the center are used at inclinations from 0 degrees to 45 degrees with the horizontal axis of the plate. Beyond the lines where the radial planes make an angle of about 45 degrees with the horizontal axis of the plate, the prisms radiate from points such as U on R—V extended beyond the plate.

Figure 5 shows the images $A^1$, $A^2$, $B^1$, $B^2$, etc., coming from typical points $A^1$, $A^2$, $B^1$, $B^2$, in Figure 4 when the source is in focus. Figure 6 is a corresponding diagram when the source is not in focus.

Comparison of Figure 5 and Figure 2 will show that the light sent out at very wide angles by the unmodified construction, has been brought in towards the vertical axis in the modified construction and that this modification has decreased this spread of beam below the horizontal. It is evident that by increasing the area of the unmodified portion of the structure the spread of beam may be increased, and by decreasing the area of the unmodified portion the spread of the beam may be decreased. Comparison of Figure 6 and Figure 3 will indicate that when the light source is out of focus the unmodified structure will give a greater spread of the light above the horizontal then the modified structure, and thus produce less glare. Therefore it is advisable to keep the modified portion of the structure as small as is consistent with producing the desired concentration of light below the horizontal.

It will be noted, however, that within the limits of spread set by the extreme prism inclination the radiating modified structure as well as the unmodified structure tends to scatter stray light above the horizontal. Moreover referring to the modified portion of the lens shown in Fig. 4, as the inclination of the prism elements increases, a greater proportion of the larger images from the centre of the reflector are intercepted by them, thus making the resultant light at low angles towards the sides of the car relatively intense compared with the light at low angles in front of the car. This is a distinct advantage.

Figure 7 shows a diagram of a modification designed to depress below the horizontal the beam at the left and towards an oncoming driver, and to deflect the beam at the right beyond a vertical plane through the axis of the headlamp.

Figure 8 shows the images from this when the source is in focus and is comparable with Figure 5. Figure 9 shows the image from this when the source is out of focus and is comparable with Figure 6.

In the previous discussion, I have omitted, for the sake of simplicity, a number of variations which enter into the practical construction of a lens, but which do not modify its operation materially. The above explanation and diagrams assume that the source is of spherical outline, while it is more apt to be conical or cylindrical. This will necessitate changes in the angles of the prisms, but the effect of moving the source out of focus will be of the same sort.

Figure 4:
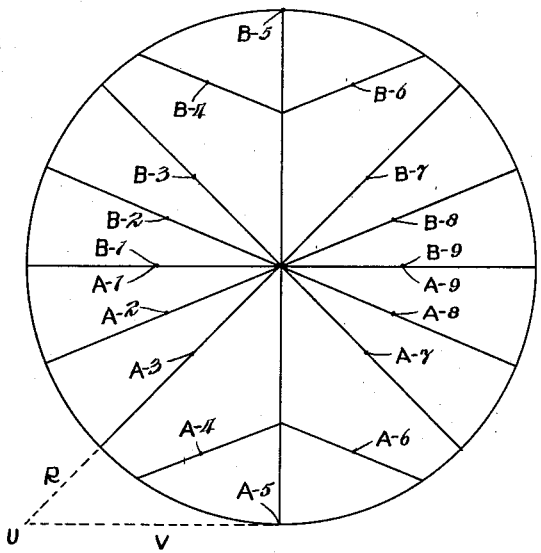
Figure 5:
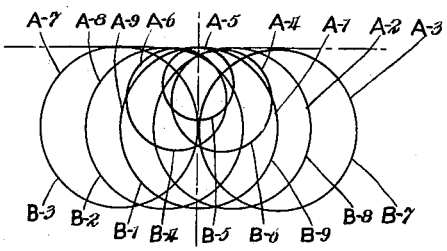
Figure 6:
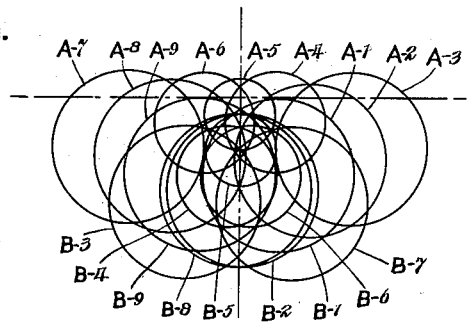

It is also true that any radial element on the prism face in Figure 4 will not be exactly parallel to the corresponding radial element on the smooth face, but the angle between the elements is too slight to affect the validity of the discussion. In Figure 4, the angle of every portion of the prism face is so adjusted that the image from that point will be deflected so that its upper edge is just tangent to the horizontal plane through the axis of the reflector. In practice, in order to simplify construction, I only approximate this condition. In some cases the prism may be in the form of a truncated pyramid with a constant angle sufficient to bring the largest image it intercepts fully below the horizontal. In that case the smaller images intercepted will not after emission extend as high as the horizontal.

The prisms may be curved in directions perpendicular to their edge to give a closer approximation to the ideal or they may be merged into prisms of less inclination as they proceed from the center of the plate.

In practice I prefer to have the prisms in any sector of the plate radiate from a point slightly beyond the center of the plate so as to secure a better impression in the glass at the center. This will not affect materially the action of the construction as set forth.

For the sake of simplicity Figures 1, 4 and 7 show lenses divided into comparatively few prisms. In practice I prefer to increase the number of prisms so as to avoid great changes in inclination of the edges of adjacent prisms. I do not limit myself to any given angle for changing from the normal radiating construction to the modified construction illustrated in the top and bottom sectors, Figures 4 and 7.

Figure 10 shows the back view of a practical embodiment of my invention in connection with a headlight plate. In so far as the prism edges are concerned quadrants MLN, NLP, PLQ, and QLM are similar and arranged symmetrically with reference to the center of the plate L. The prisms in the sector MLR radiate from point T. In the sector RLN prism V is horizontal and the balance of the prisms radiate from the point U. All prisms are designed to depress the light below the horizontal axis of the lamp when the light source is in focus. Points W, W, W, are those at which the angle of the prisms are changed so as to bring the smaller images reflected from the edge of the reflector up close to the horizontal. When the light source is moved out of focus that part of the beam thrown above the horizontal will be widely scattered in the manner set forth in the preceding discussion. If any portion of the headlight system be inaccurate, it will produce in effect a local displacement from focus and that part of the beam thrown above the horizontal by this local displacement will be widely scattered.

I have found that the paraboloidal silvered metal reflector commonly used in headlamps is much more apt to vary so as to approach ellipsoidal shapes than to vary so as to approach hyperboloidal shapes. In the ellipsoid the paraboloidal beam effect will be more closely approached when the most widely spread reflected rays converge rather than diverge. Therefore the reflector with a tendency towards ellipsoidal form, when adjusted to give maximum beam will act more like the true paraboloid with source forward of focus giving convergence than like the true paraboloid with source back of focus giving divergence. Observation of headlamps in use with plain front glasses will show that objectionable glare above the horizontal will more often originate in the lower hemisphere of the reflector indicating convergence of rays than in the upper hemisphere of the reflector indicating divergence. My construction is therefore especially useful on the lower half of a headlight plate.

Figure 11 is a vertical cross section of the lens shown in Figure 10 in combination with a lamp and reflector. The course of typical light rays is shown in the figure. $c$ is a light placed in the focus of a parabolic mirrored reflector, $d$, of the usual type. $e$ is a lens embodying my invention with prisms $f$ on its inner surface. $g$ is a light ray proceeding from the extreme back of the light source and striking reflector $d$ at point $h$. It will be reflected above the horizontal to point $i$ on the plate (see Figure 10). The prisms at $i$ will bend it down into the horizontal direction $j$. $k$ is a light ray proceeding from the extreme back of the light source and striking the reflector $d$ at point $l$. It will be reflected above the horizontal to point $m$ on the plate (see also Fig. 10). The prism at M will bend it out from the vertical axis of the reflector and into the horizontal direction $n$. $o$ is a light ray proceeding from the extreme back of the light source and striking the reflector $d$ at the point $p$. It will be reflected above the horizontal to point $q$ on the plate (see also Fig. 10). The prism at $q$ will bend it out slightly from the vertical axis of the reflector and down into the horizontal direction $r$. $s$ is a light ray proceeding from the extreme front of the light source and striking the reflector $d$ at point $t$. It will be reflected above the horizontal to point $u$ on the plate (see also Fig. 10.) The prism at $u$ will bend it in across the vertical axis of the reflector and down into the horizontal direction $v$. All other rays from the light source striking the points will be reflected at lower angles than the extremes shown and be emitted by the prisms at angles below the horizontal.

Figure 12:
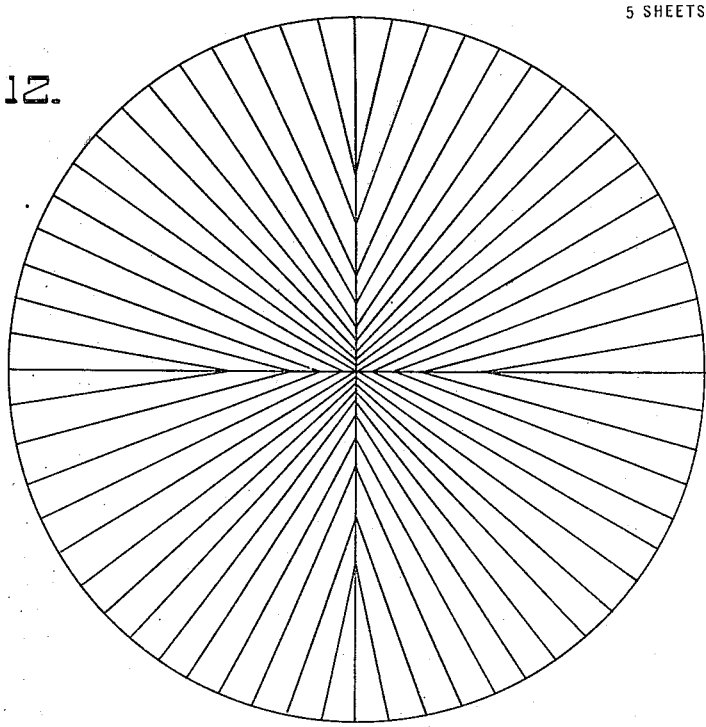
Figure 13:
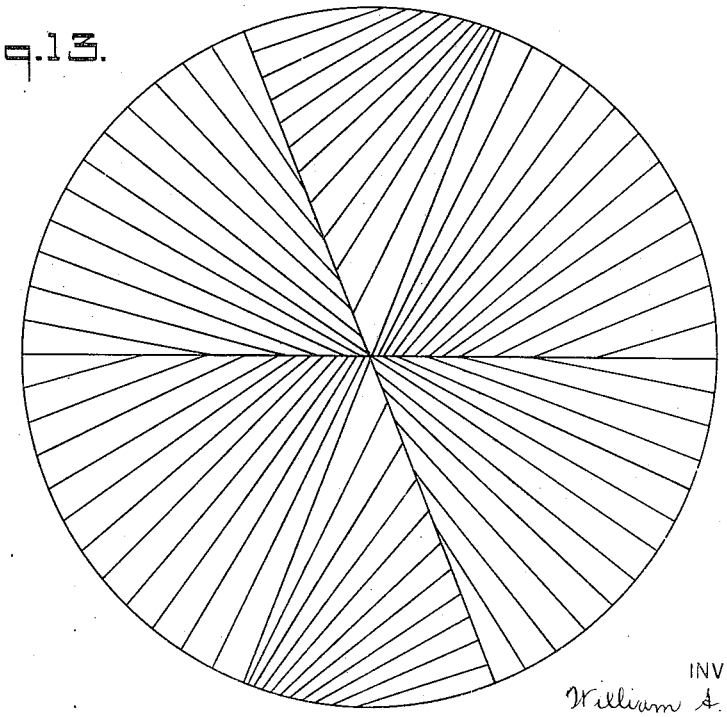

Figures 12 and 13 show the back view of another form of plate embodying my invention.

Figure 12 is a practical plate along the lines of the theoretical plate shown in Figure 1 and Figure 13 is a practical plate along the lines of that shown in Figure 7. The plate shown in Figure 12 is divided into quadrants and the prisms in each quadrant converge towards a point beyond the center of the plate. Therefore, none of the prism edges lie in the vertical plane and it is possible to reflect the light below the horizontal in a very wide symmetrical beam.

The plate shown in Figure 13 differs from diagram shown in Figure 7 in that the prisms corresponding to $b^1$—$b^2$ $a^1$—$a^2$ converge on a point beyond the center of the plate while the prisms corresponding to $b^4$—$b^5$, $a^6$—$a^{10}$ build up the light to the right of the axes and below the horizontal instead of to the left of the axes and below the horizontal as is the case in Figure 7.

Having described my invention, what I claim is:—

1. An illuminating appliance comprising a source of light, a reflector therefor, and a plate adapted to receive light rays from the reflector, such plate being divided into a plurality of sections by the vertical and horizontal diameters of the plate, each of such sections being covered by a system of prisms which are radial from a point beyond the center and in the section diagonally opposite, and adapted to deflect the reflected light rays below a definite horizontal suppression line in a wide beam.

2. An illuminating appliance comprising a source of light, a parabolic reflector surrounding the same and a plate covering the mouth of such reflector, such plate being divided into four sections by the vertical and horizontal diameters of the plate, each of such sections being covered by a system of prisms which are radial from a point beyond the center and in the section diagonally opposite, and adapted to deflect the reflected light rays below a definite horizontal suppression line in a wide beam.

3. An illuminating appliance comprising a source of light, a reflector therefor, and a plate adapted to receive light rays from the reflector, such plate being divided into sections, a plurality of such sections extending to the center of the plate and provided with two sets of radial prisms one of which sets is converged towards the center of the plate and the second of which converges towards the edge of the plate and adapted to deflect the reflected light rays within definite suppression lines in a wide beam.

4. An illuminating appliance comprising a source of light, a reflector therefor, and a plate adapted to receive light rays from the reflector, such plate being divided into sections extending to the center of the plate and provided with radial prisms converging towards a point beyond the center of the plate in combination with sections provided with radial prisms converging toward the edge of the plate and adapted to deflect the reflected light within definite suppression lines in a wide beam.

WILLIAM A. DOREY.

Witnesses:
HOWARD L. JENKINS,
H. M. CARR.